Sept. 2, 1952 W. J. TURNUPSEED ET AL 2,609,425
PROTECTIVE SYSTEM FOR ELECTRICAL APPARATUS
CONNECTED WITH POLYPHASE NETWORKS
Filed Oct. 24, 1949 2 SHEETS—SHEET 1
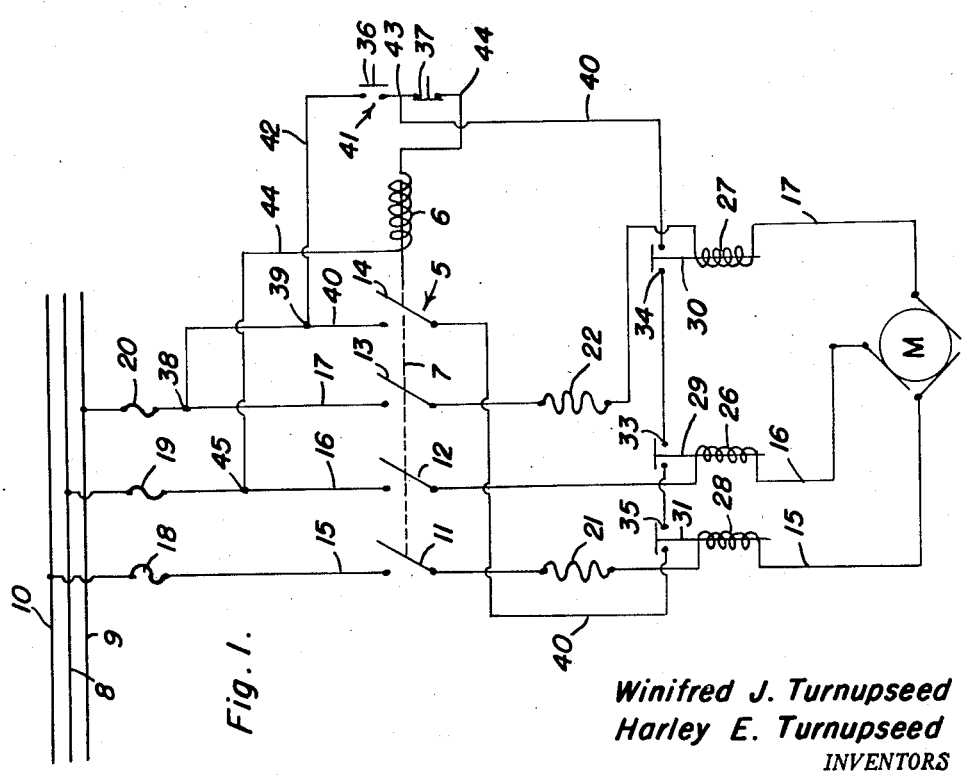
Winifred J. Turnupseed
Harley E. Turnupseed
INVENTORS Inventors
Winifred J. Turnupseed
Harley E. Turnupseed Patented Sept. 2, 1952

2,609,425

UNITED STATES PATENT OFFICE 2,609,425

PROTECTIVE SYSTEM FOR ELECTRICAL APPARATUS CONNECTED WITH POLYPHASE NETWORKS

Winifred J. Turnupseed, Porterville, and Harley E. Turnupseed, Tulare, Calif.

Application October 24, 1949, Serial No. 123,172

3 Claims. (Cl. 175—294)

This invention relates to protective systems for polyphase circuits containing electric motors especially induction motors and other apparatus and it has for its main object to provide a complete protection against interruption or abnormal voltage drops in one phase line of the system.

It is well known that the normal overload protection used in A. C. networks is inadequate under certain conditions in polyphase networks, especially when a large number of electric motors is connected with the network. When, for instance, an interruption in one of the phase lines of a polyphase system occurs by the blowing of a fuse in said line or from some other causes, the motors connected with the network continue to run, the power being supplied by the remaining phase or phases. The extra load may lead to a burning out of the motor. A similar overloading is the consequence of a marked or abnormal voltage drop in one phase line.

Customarily protection of the apparatus and motors connected with a polyphase network is obtained by means of special overload relays which are preferably used concurrently with a low voltage release device. Such an arrangement gives good results in most networks, but does not eliminate completely the danger of burning out of a polyphase motor in the event of a phase line interruption, as such a protection is dependent on the heating or on the adjustment of the overload relay which is usually determined by other circumstances. It has therefore been proposed to use in a three phase system, for instance, two overload relays between the network and the automatic interrupter, usually called magnetic switch, and one or two no-load or undervoltage relays in the phase lines, sometimes arranged at the same spot and sometimes arranged between the automatic circuit breaker and the motor or apparatus connected with the network.

These systems are relatively complex and they also entail the arrangement of further relays for controlling the flow of current through the automatic circuit breaker and through relays controlling the no load feature of the no load relays. Arrangements of these types also, in many cases, entail the use of a separate source of current for starting the electric motors.

It is the object of this invention to simplify this arrangement and to reduce it to the absolutely essential number of protective devices which are preferably so constructed that they may directly cooperate with the overload relays, thus reducing the equipment practically to three combined relays in a three phase system, for instance. Present systems, other than those of a very complex character, merely afford protection against certain types of overloads by means of relays; while the system contemplated by the invention employs only three additional series relays to afford full protection by guarding against those overloads which are caused by an interruption of voltage in any one phase line of a polyphase network.

Further and more specific objects will be apparent from the following detailed specification.

The invention is illustrated by way of example in the accompanying drawing showing two embodiments thereof. It is however to be understood that the examples given have been selected in order to explain the principle of the invention and the best mode of applying this principle. Modifications of the embodiments which have been illustrated are therefore not necessarily departures from the essence of the invention.

In the drawing:

Figure 1 is a circuit diagram of the connections of the protective system according to the invention.

Figure 2 is a diagram of the relay used according to the invention for protection against current failure in a phase line.

Figure 3:
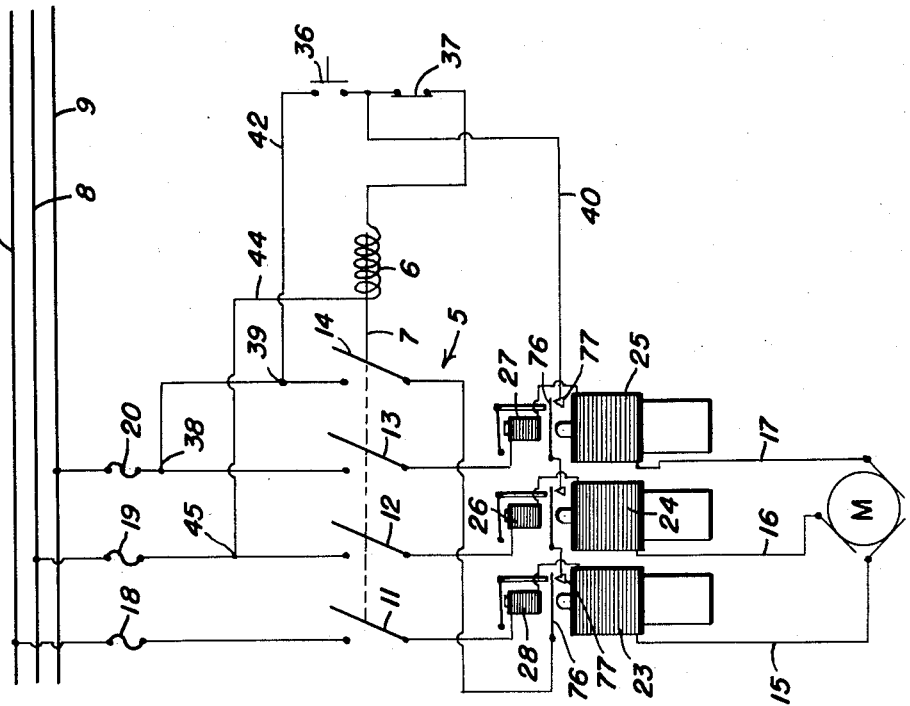
Figure 3 is a diagram of the connections of the system according to the invention using improved overload relays.

As has been explained above the invention has for its object to provide a protective system for polyphase networks guarding mainly against current interruption or voltage drops in a single phase line which leads to an overloading of a motor, for instance, in the remaining phases, usually a single phase in a three phase network. Such protection is especially desirable in networks supplying a very large number of electric motors, as is the case for instance, in an oil field, where a defect caused by one motor may lead to damage in many units.

In order to give full protection against overloads as well as against under voltage, it is preferable to provide a system with protective devices separately responsible to overloads due to an interruption of a phase line and to overloads due to other sources, which system uses however merely a single circuit breaker operated by the said device.

A three phase network has been selected as an example. The system comprises a single automatic circuit interrupter 5 which may be part of a more elaborate structure, such as a compensator, but which is shown in Figure 1 merely as an automatic circuit provided with an operating coil 6 tripping four switch or contact arms 11, 12, 13, 14, by means of a suitable armature 7. Three of said switch or contact arms control the three phase lines 15, 16, 17 which are supplied with current from the three phase network 8, 9, 10. Between the switch or contact arms and the network the fuses 18, 19, 20 are inserted, protecting against overloads due to certain defects.

It may be mentioned that the fuses do not offer sufficient overload protection, as every motor is subjected during the starting phase and also during operation to high momentary overloads which do not damage the motor. Such overloads must be tolerated, as otherwise great inconvenience would result from the constant blowing of fuses. Therefore, in addition to these fuses, overload relays 21, 22 in Figure 1, 23, 24, 25 in Figure 3 have been arranged in order to permit high overloads of a momentary character, while sustained overloads are operating the overload relays.

In the modification of the invention shown in Figure 1, which figure illustrates the principle of the invention, only two overload relays 21, 22 are arranged which in this case are of the well known type operated by heater units, a type which is most frequently used and need not be illustrated or described. These relays have their heating coils arranged in the phase lines 15, 17 leading to the three phase motor M. The phase lines 15, 16, 17 also contain the relay coils 26, 27, 28 of the under load relays, each of which is provided with an armature 29, 30, 31 normally held in an open position by spring action or the like, while these armatures will close or bridge contacts 33, 34, 35 upon energization of the relay coils.

The fixed contacts 33, 34, 35 of these relays are arranged in series and form part of a circuit 40 which branches off from one of the phase conductors 17 at a point 38 located between the network and the circuit interrupter 5. This circuit also includes the fourth switch arm 14 of circuit breaker 5 and, after having passed the fixed contacts 35, 33, 34 of the three under load relays, is connected with point 43 on the starter device 41.

The starter device 41 includes the two push buttons 36, 37 for starting and stopping the electric motor. These buttons, as usual, after having been pressed, return to their original position shown in Figure 1. The starter device moreover includes two circuits 42, 44 one including the starter button contacts 36, the other the stop button contacts 37 which circuits are joined with each other and with circuit 40 at junction point 43.

The circuit 42 branches off from one of the phase conductors 17 either directly or by using a junction point 39 on circuit 40 connected with phase line 17, while circuit 44 includes the coil 6 of the circuit interrupter 5 and is connected with another phase line 16 at a point 45, arranged between the circuit interrupter contact 12 and the network.

The construction of the under load relays is illustrated in Figure 2. The relay comprises a laminated frame structure 50 with three legs 51, 52, 53. On the central leg 51, the coil 54 is mounted, the winding of said coil being connected with one of the phase lines as shown in Figure 1. On one leg 53 an armature 60 is pivotally mounted by means of supports 64 fixed on said leg and carrying the pivot 55 of the armature. The armature faces the legs and is provided with a contact strip or spring 57, one end 63 of which is attached to a spring 56 which is anchored at a point of the bracket 62 projecting from and insulated from and fixed to leg 53.

At the end of contact strip or spring 57 a movable contact 58 of the relay is arranged which cooperates with the fixed contact 59 on contact strip 61 which is fixedly mounted on but insulated from leg 52 of the frame structure 50. Contacts 58, 59 correspond to contacts 33, 34, 35 of Figure 1 and coil 54 corresponds to coils 28, 26, 27 of this figure.

Obviously, upon energization of the coil 54, contacts 58 and 59 are closed, while upon de-energization of the coil 54 the contacts are held open by spring 56.

The fixed contact strip 61 and the movable contact strip 57 are both provided with terminal screws permitting connection of the contacts with the circuit 40.

The arrangement shown in Figure 1 is obviously much simplified when compared with known arrangements of an automatic circuit breaker controlled by protective relays which is combined with a start and stop circuit. A single circuit 40 with two branches 42, 44 contains in series all the under load relay contacts, the circuit breaker coil and the start and stop buttons. This circuit therefore is the sole addition to the customary arrangement.

The operation of the arrangement will be readily understood by assuming for instance that the motor is first started by pressing starter button 36. This closes circuits 42, 44 which include coil 6 of the circuit breaker 5. Coil 6 thereby moves its armature 7 from its position of rest shown in Figure 1 to its operative position closing the switch arms 11, 12, 13 and 14, and thereby connecting the phase conductors 15, 16, 17 with the network 8, 9, 10. The electric motor, which may be an induction motor, will thereupon start and run normally. When the push button 36 is released the coil 6 remains in the circuit and is energized over circuit 40 which includes the contacts 33, 34, 35 of the under load relays.

During such normal operation current will flow through the heater coils 21, 22 and through all three under load relay coils 26, 27, 28.

It will be noted that the fuses 18, 19, 20 must be so selected that they can stand the high overload, which usually is more than three times the normal amperage, occurring at the starting of the induction motor. Such a momentary overload will not affect the overload relays which, as well known, are always delayed action relays, operating in this instance by means of heating coils. The time delay must be such that under normal load conditions they operate before the motor has been heated sufficiently to be damaged.

However, on account of the time delay and of the adjustment of these relays they fail to protect sufficiently against overloads due to phase interruption. In the event of such an interruption, for instance caused by the blowing of fuse 18, the current in phase line 15 fails and relay 28 is de-energized, opening contacts 35.

Circuit 40 is interrupted and coil 6 becomes de-energized. The circuit breaker is thereby tripped and returns into the position shown in Figure 1 in which the phase lines are opened.

The modification of the invention which is illustrated in Figure 3 shows a practical example of the cooperation of overload relays and under load relays, making practically a single unit out of these two relays.

The circuit arrangement is essentially the same as that shown in Figure 1 except for the fact that overload relay coils 23, 24, 25 have been substituted for the heater coils 21, 22. The relays 23, 24, 25 now cooperate with the under load relays indicated at 26, 27, 28 and this cooperation is illustrated in detail in Figure 4.

Figure 4:
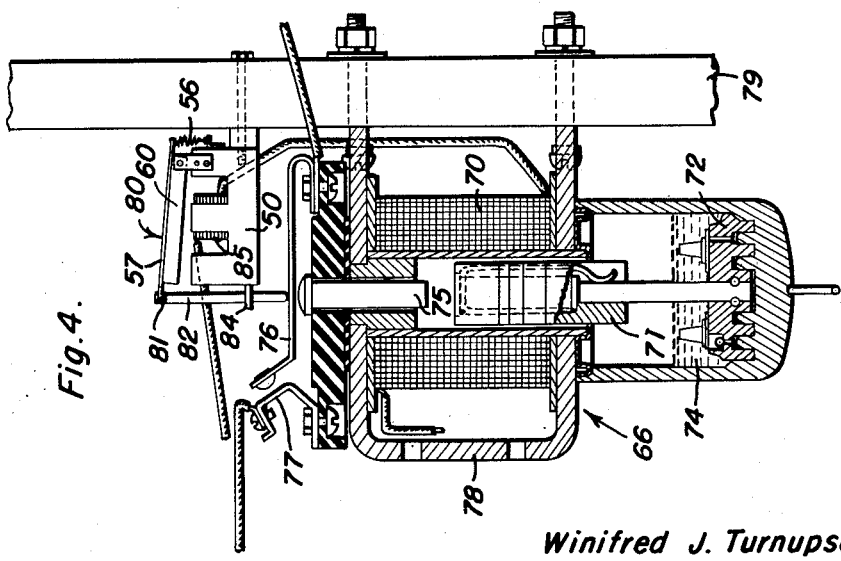
Figure 4 is a partly diagrammatic elevational and sectional view of an overload relay provided with the additional protective equipment.

The overload relay 66 shown in Figure 4 is of a well known type which is widely used and it comprises a solenoid coil 70 with a core 71 to which a piston 72 is attached moving in an oil sump 74. The piston moving in the oil produces the required time lag on one hand and in addition also enables the operator to adjust the time lag and to adjust the current at which the relay should operate.

A pin 75 arranged in the top structure of the relay operates the contact spring 76 when the solenoid core has been attracted by the coil. The relays of this type are usually encased in a casing 78 and are mounted on a suitable support 79 in the manner shown. With these known relays the contact spring 76 normally rests on fixed contact 77 and the contacts are therefore closed until opened by the upward movement of the core 71. However with the modified construction illustrated in Figure 4 the contacts 76, 77 are normally open.

According to the invention the under load relay 80 is added to this relay construction. The under load relay comprises substantially the same parts which have already been described in connection with Figure 2, but in this modification the strip 57 does not carry a contact but merely carries a hinge 81 to which a plunger pin 82 is attached. The plunger pin passes through a guide 84 and rests on the contact spring 76 of the overload relay. Its weight does not close contacts 76, 77 but any electromagnetic action of the relay 80 immediately closes the contacts 76, 77.

The coil 85 of the under load relay is connected in series with the coil 70 of the overload relay. The relay 80 has therefore no special contacts, but operates contacts 76, 77 conjointly with the overload relay 66.

The operation is very similar to that already described in connection with Figure 1, except that in this case the contacts 76, 77 are the sole contacts which are operated, thus simplifying the cooperation between the overload relay and the under load relay.

When the motor has been started by pressing button 36, both coils 28, 23; 26, 24; 27, 25; corresponding to coils 70 and 85 in Figure 4, are energized. Armature 60 of relay 80 is therefore attracted and pushes pin 82 downwardly thus closing contacts 76, 77.

The current surge at the start and the normal current flowing through coil 70 do not operate the overload relay 66 because the oil seal holds the piston 72 back.

If however an overload occurs, lasting for sometime, the heavier current due to the overload now flows through the coil 70 and moves the piston slowly upwardly and finally by means of pin 75 trips the contacts 76, 77. Therefore circuit 40 is interrupted and coil 6 is de-energized as this coil (as explained in connection with Figure 1) is included in circuit 40. The circuit breaker 5 therefore opens the switch arms whenever an overload will occur.

On account of the delayed action and also on account of the necessary adjustment of the current flowing through the coil which is adapted to operate the relay the overload relay itself is not capable of protecting the induction motor against single phase overloading. However, under the system contemplated by the invention, if an under voltage or an interruption in one of the phase lines, say in phase line 15, should occur, relay 80 will release armature 60 and plunger pin 82 will no longer hold contacts 76 pressed against contact 77. Thereby the circuit 40 is again interrupted, coil 6 is de-energized, and the switch arms 11, 12, 13, 14 are opened thereby and the motor is entirely cut off from the network.

It will therefore be seen that the arrangement according to the invention provides a simplified and effective protective system, safeguarding motors and other apparatus connected with a polyphase network against all failures which may occur.

It is also to be understood that the details of the construction may be changed and varied in many ways without affecting the essence of the invention as the structural details of some of these relays are not essential for the system.

Having described the invention, what is claimed as new is:

1. In a protective system for polyphase networks in combination, an under-voltage relay having an open frame carrying the relay coil and having an armature hinged to said frame and closing the open side of said frame when attracted by the relay coil, a member projecting from said armature and a push rod hingedly attached to said projection, an overload relay provided with a casing having an insulated cover, a contact making resilient member mounted on said cover, a fixed contact mounted for cooperation with the said resilient member on said cover, said resilient contact member being operatively positioned so as to be moved towards the said fixed contact by the push rod of the under-voltage relay, and movable means operative by said overload relay acting on said resilient contact member to move it away from the fixed contact upon operation of said overload relay.

2. A protective system for polyphase networks with phase lines controlled by an automatic electromagnetically operated circuit breaker, including an operating coil and a plurality of armatures, cooperating with fixed contacts controlling the phase lines, comprising a starter circuit, including a normally open start contact switch, a normally closed stop contact switch, both returning to their normal position after operation, and the operating coil of the circuit breaker, connected on one side with one phase line and on the other side with another phase line, an overload relay in each of said phase lines and an underload relay in each of said phase lines, a single contact pair in each phase line operated by the overload relay and underload relay of each phase line cooperating with each other, each of said relays having independently operable electromagnetically controlled means acting on said single contact pair, the overload relay opening and the underload relay closing said contact pair during energization, a circuit branch arranged in parallel to the section of the starter circuit containing the normally open start contact switch, said circuit branch including a further armature and fixed contact of the electromagnetic circuit breaker, and further including all the single contacts controlled by the cooperating pairs of overload and underload relays in series, said contacts being closed when the underload relays are energized, thus keeping the starter circuit supplied with current after the operation and return of the start contact switch, but making operation dependent on predetermined voltage and current conditions in all phase lines provided with cooperating relay pairs.

3. A protective system for polyphase networks with phase lines controlled by an automatic electromagnetically operated circuit breaker, including an operating coil and a plurality of armatures, cooperating with fixed contacts controlling the phase lines, comprising a starter circuit, including a normally open start contact switch, a normally closed stop contact switch, both returning to their normal position after operation, and the operating coil of the circuit breaker, connected on one side with one phase line and on the other side with another phase line, an overload relay in each of said phase lines and an underload relay in each of said phase lines, a single contact pair in each phase line operated by the overload relay and underload relay of each phase line cooperating with each other, each of said relays being located on a different side of said contact pair and each being provided with a push member moving on one of the contacts of the single pair upon energization, said push member being moved by an electromagnetically operated member of the respective relay, the overload relay closing and the underload relay opening the contact pair during energization, a circuit branch arranged in parallel to the section of the starter circuit containing the normally open start contact switch, said circuit branch including a further armature and fixed contact of the electromagnetic circuit breaker, and further including all the single contacts controlled by the cooperating pairs of overload and underload relays in series, said contacts being closed when the underload relays are energized thus keeping the starter circuit supplied with current after the operation and return of the start contact switch, but making operating dependent on predetermined voltage and current conditions in all phase lines provided with cooperating relay pairs.

WINIFRED J. TURNUPSEED.
HARLEY E. TURNUPSEED.

REFERENCES CITED

The following references are of record in the file of this patent:

UNITED STATES PATENTS

| Number | Name | Date |
| --- | --- | --- |
| 969,345 | Culver | Sept. 6, 1910 |
| 1,063,179 | Burnham | June 3, 1913 |
| 1,179,637 | Kruse | Apr. 18, 1916 |
| 1,189,409 | Van Alstyne | July 4, 1916 |
| 1,199,447 | Wikander | Sept. 26, 1916 |
| 1,314,332 | Jones | Aug. 26, 1919 |
| 1,775,658 | Seeger | Sept. 16, 1930 |
| 1,800,256 | Keller | Apr. 14, 1931 |
| 2,060,481 | Austin | Nov. 10, 1936 |
| 2,431,886 | Pavitt | Dec. 2, 1947 |

FOREIGN PATENTS

| Number | Country | Date |
| --- | --- | --- |
| 611,164 | Germany | Mar. 22, 1935 |

OTHER REFERENCES

Electrical Review article, pages 821–823, issue of Nov. 22, 1946.